United States Patent Office 2,717,828
Patented Sept. 13, 1955

2,717,828

HERBICIDAL COMPOSITIONS

Gail H. Birum and Arthur H. Schlesinger, Dayton, Ohio, assignors to Monsanto Chemical Company, St. Louis, Mo., a corporation of Delaware No Drawing. Application March 12, 1953,
Serial No. 342,011

19 Claims. (Cl. 71—2.3)

The present invention provides new and valuable compositions possessing high herbicidal efficacy and methods of destroying or preventing plant growth in which such compositions are used.

We have found that improved, very efficient, herbicidal compositions are obtained when there are prepared oil-in-water emulsions of a mono- or di-thioperoxide having the formula

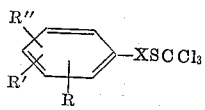

in which X is selected from the class consisting of —O— and —S— and R, R', and R'' are selected from the class consisting of hydrogen, alkyl radicals of from 1 to 5 carbon atoms, chlorine and the nitro radical.

One group of compounds having the above formula are the aryl trichloromethanesulfenates of the formula

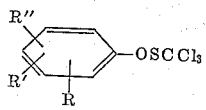

wherein R, R' and R'' are as defined above. These sulfenates are readily obtainable in known manner, for example by the reaction of phenol or an appropriately substituted phenol with perchloromethyl mercaptan substantially as described, e. g., by Connolly and Dyson in the Journal of the Chemical Society (London), pp. 679–81 for 1935. As examples of sulfenates having the above formula and useful for the present purpose may be mentioned phenyl trichloromethanesulfenate, 2-, 3- or 4-chlorophenyl trichloromethanesulfenate, 2-, 3- or 4-nitrophenyl trichloromethanesulfenate, 3,4- or 2,5-dichlorophenyl trichloromethanesulfenate, 2,3,4- or 2,4,5-trichlorophenyl trichloromethanesulfenate, 2,4-dinitrophenyl or 2,3,4-trinitrophenyl trichloromethanesulfenate, 2-chloro-4-nitrophenyl trichloromethanesulfenate, 2,3-dichloro-4-nitrophenyl trichloromethanesulfenate, 2-, 3-, or 4-tolyl trichloromethanesulfenate, 2-, 3- or 4-ethylphenyl trichloromethanesulfenate or 2-, 3- or 4-n-amylphenyl trichloromethanesulfenate, 4-isopropyl-2-methylphenyl trichloromethanesulfenate, 3,4,5-trimethylphenyl trichloromethanesulfenate, ar-dichloro-4-ethylphenyl trichloromethanesulfenate, ar-dinitro-4-tolyl trichloromethanesulfenate, ar-nitro-ar-chloro-3-tert-butylphenyl trichloromethanesulfenate, etc.

Another group of compounds useful for the present purpose and having the above general formula are trichloromethyl aryl disulfides of the formula

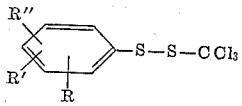

in which R, R' and R'' are selected from the class consisting of hydrogen, chlorine, alkyl radicals of from 1 to 5 carbon atoms, and the nitro radical. Examples of disulfides having the above formula are phenyl trichloromethyl disulfide, 2-, 3- or 4-tolyl trichloromethyl disulfide, 2-, 3- or 4-n-propylphenyl trichloromethyl disulfide, p-xylyl trichloromethyl disulfide, triethylphenyl trichloromethyl disulfide, 2-, 3- or 4-chlorophenyl trichloromethyl disulfide, 3,4-dichlorophenyl trichloromethyl disulfide, ar-trichlorophenyl trichloromethyl disulfide, 2-, 3- or 4-nitrophenyl trichloromethyl disulfide, 2,3-dinitrophenyl trichloromethyl disulfide, 4-chloro-2-nitrophenyltrichloromethyl disulfide, chlorodinitrophenyl trichloromethyl disulfide, ar-dichloro-4-tolyl trichloromethyl disulfide, ar-dinitro-4-isoamylphenyl trichloromethyl disulfide, ar-chloro-ar-nitro-3-ethylphenyl disulfide, etc. The presently useful disulfides are readily obtainable by reaction of perchloromethyl mercaptan with an alkali metal salt of benzenethiol or of the appropriately substituted benzenethiol.

The present compositions are characterized by a high degree of efficacy in that even in very low concentration, e. g., in a concentration of as low as 0.1 per cent, they are extremely injurious to both broad- and narrow-leafed plant growth. Herbicidal compositions containing the present mono- or dithioperoxides are readily obtained by first preparing a solution thereof in an organic solvent and then adding the resulting solution to water containing an emulsifying agent to form an emulsion. Because of the very high herbicidal efficiency of the present compounds, they are present in the herbicidal composition in only very small concentrations, for example in concentrations of from 0.1 per cent to 2 per cent by weight of the total weight of the emulsion. Emulsifying agents which may be employed are those customarily used in the art for the preparation of oil-in-water emulsions. Examples of emulsifying agents which may be used include alkylbenzenesulfonates, long chained polyalkylene glycols, long chained succinates, etc.

The emulsions may be used to destroy already existing plant growth by direct application to the undesirable plants, e. g., by spraying; or the emulsions may be employed to prevent plant growth by application to media which normally support plant growth. When employed to prevent plant growth, for example in parking areas, highway abutments, railway yards, etc., the emulsions may be applied by spraying only the surface of said media or they may be admixed with said media. Generally, spraying of only the soil surface is sufficient to prevent plant growth in areas which are to be kept clear of plants. However, the emulsions may be incorporated into customarily employed temporary surfacing materials, e. g., oil, cinders, etc.

The present invention is further illustrated, but not limited, by the following examples:

Example 1

Spray testing of the present herbicidal compositions was conducted as follows:

Respective solutions of the mono- or dithioperoxides shown below and an emulsifying agent were added to water, the quantity of solution employed being calculated to give emulsions containing 1.0 per cent, 0.3 per cent and 0.1 per cent by weight, respectively, of said mixture, based on the weight of the total emulsion. Said emulsifying agent comprised a mixture of a polyalkylene glycol derivative and an alkylbenzenesulfonate.

Three week old corn and bean plants were sprayed with the respective emulsions, two plants of each variety being employed. The spraying was continued until droplets formed on and/or fell from the foliage and stems of the sprayed plants, up to 15 ml. of the emulsion being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any.

For purposes of comparison, cyclohexanone, employed as the solvent in the above test, as well as a number of related, chloro-, nitro and/or sulfur-containing compounds were submitted to the same spray test. The following results were obtained:

| Compound Tested at Percent Concentration | Extent [1] of Injury on— | |
|---|---|---|
| | Bean | Corn |
| 2-Chlorophenyl trichloromethanesulfenate: | | |
| 1.0% | 4, 4a | 4, 4a |
| 0.3% | 3 | 3 |
| 0.1% | 1 | 2 |
| 4-Chlorophenyl trichloromethanesulfenate: | | |
| 1.0% | 3, 4a | 4, 4a |
| 0.3% | 3, 4a | 4, 4a |
| 0.1% | 2 | 2 |
| 3-Chlorophenyl trichloromethanesulfenate: | | |
| 1.0% | 3 | 4, 4a |
| 0.3% | 2 | 2 |
| 0.1% | 1 | 1 |
| 2,4-Dichlorophenyl trichloromethanesulfenate: | | |
| 1.0% | 4, 4a | 4, 4a |
| 0.3% | 3 | 3 |
| 0.1% | 1 | 2 |
| Phenyl trichloromethanesulfenate: | | |
| 1.0% | 3 | 3 |
| 0.3% | 1 | 2 |
| 2,4,5-Trichlorophenyl trichloromethanesulfenate: | | |
| 1.0% | 4, 4a | 4, 4a |
| 0.3% | 3 | 3 |
| 0.1% | 1 | 1 |
| 4-Nitrophenyl trichloromethanesulfenate: | | |
| 1.0% | 4, 4a | 4, 4a |
| 0.3% | 4, 4a | 4, 4a |
| 0.1% | 3 | 1 |
| 2-Chloro-4-nitrophenyl trichloromethanesulfenate: | | |
| 1.0% | 4, 4a | 4, 4a |
| 0.3% | 4, 4a | 4, 4a |
| 0.1% | 4, 4a | 4, 4a |
| 4-Tolyl trichloromethyl disulfide: | | |
| 1.0% | 3 | 4, 4a |
| 0.3% | | 4, 4a |
| 0.1% | | 3 |
| 2,2'-Sulfonylbis(4,6-dichlorophenol): | | |
| 1.0% | 0 | 0 |
| 0.3% | 1 | 1 |
| 1,2-Bis(phenylmercapto)ethane: | | |
| 1.0% | 1 | 1 |
| 0.3% | 0 | 0 |
| N-Isopropyl-2-benzothiazolesulfenamide: | | |
| 1.0% | 0 | 0 |
| 0.3% | 0 | 0 |
| β-(2,4-Dichlorophenoxyethyl)-tert-dodecyl sulfide: | | |
| 1.0% | 0 | 0 |
| 0.3% | 0 | 0 |
| 5-Nitro-2-hydrobenzyl chloride: | | |
| 1.0% | 0 | 0 |
| 0.3% | 0 | 0 |
| 3-Nitro-4-chlorobenzotrifluoride: | | |
| 1.0% | 0 | 0 |
| 0.3% | 0 | 0 |
| Cyclohexanone: | | |
| 1.0% | 0 | 0 |
| 10.0% [2] | 0 | 0 |

[1] 0=no effect; 1=slight effect; 2=moderate injury; 3=severe injury; 4=plant dead; 3a=leaves dried; 4b=leaves dropped.
[2] This was simply a 10 percent aqueous solution of the ketone.

The above results clearly demonstrate the high herbicidal efficiency of the present mono- or dithioperoxides. That herbicidal efficiency cannot be related merely to the presence of either chlorine, sulfur or nitrogen or a combination thereof in a compound is also apparent from the test results.

*Example 2*

Another method of testing for herbicidal efficiency of a chemical involves noting the effects on seed germination and plant growth which may be evidenced by spraying soil surfaces. This test, commonly known as a "pre-emergence" test was conducted as follows:

Boxes having a 5" x 5" exposed area were partially filled with a layer of soil and 20 seeds were placed thereon and then covered with a ¼" to ½" layer of soil which had been screened to ¼" sieve. Test boxes containing 20 seeds each of radish, beet, mustard, morning glory and cheat grass seeds, respectively, were prepared. The surface soil of the seeded boxes were then sprayed, respectively, with a 1.0 per cent emulsion of 2-chloro-4-nitrophenyl trichloromethanesulfenate prepared as in Example 1. The quantity of emulsion which was applied was calculated to correspond to 50 lbs. of the sulfenate per acre, 9.1 cc. of the 1.0 per cent emulsion per 25 sq. in. of surface soil being calculated to correspond to 50 lbs. of the chemical per acre. The sprayed boxes as well as similar seeded but unsprayed boxes were then maintained at standard conditions of temperature and watering for a period of two weeks. At the end of that time the number of healthy seedlings in each box was counted. Thus the number of non-emerging and damaged seedlings was obtained by difference. This difference is designated as "X." "Per cent phytotoxicity" was determined by the ratio of "X" to the number of healthy seedlings in the controls.

There was evidenced a 100 per cent phytotoxicity to all of the broad-leafed plants, i. e., radish, mustard, morning glory, and beet and a 46–70 per cent phytotoxicity to the other test specimens.

While the present mono- or dithioperoxides are most advantageously employed as herbicides by incorporating them into an aqueous emulsion as herein described, they may also be employed in other plant-destroying methods. Thus they may be incorporated into solid carriers such as clay, talc, pumice and bentonite to give herbicidal compositions which may be applied to living plants or to surfaces which are to be freed from plant growth. They may also be mixed with liquid or solid agricultural pesticides, e. g., insecticides and fungicides. While solutions of the present compounds in organic solvents may be employed for preventing and destroying plant growth, we have found that the emulsions possess an improved tendency to adhere to the treated surfaces and that less of the active ingredients is required to give comparable herbicidal efficiency.

What we claim is:

1. A herbicidal composition comprising an oil-in-water emulsion of a compound having the formula

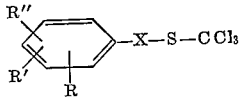

in which X is selected from the class consisting of —O— and —S— and R, R' and R" are selected from the class consisting of hydrogen, alkyl radicals of from 1 to 5 carbon atoms, chlorine and the nitro radical.

2. A herbicidal composition comprising an oil-in-water emulsion of a substituted phenyl trichloromethanesulfenate containing as the only substituents in the phenyl radical from 1 to 3 alkyl groups having from 1 to 5 carbon atoms, said sulfenate being present in said composition in a quantity which is toxic to plant life.

3. A herbicidal composition comprising an oil-in-water emulsion of a substituted phenyl trichloromethanesulfenate containing as the only substituents in the phenyl radical from 1 to 3 chlorine atoms, said sulfenate being present in said composition in a quantity which is toxic to plant life.

4. A herbicidal composition comprising an oil-in-water emulsion of a substituted phenyl trichloromethanesulfenate containing as the only substituents in the phenyl radical from 1 to 3 nitro radicals, said sulfenate being present in said composition in a quantity which is toxic to plant life.

5. A herbicidal composition comprising an oil-in-water emulsion of a substituted phenyl trichloromethanesulfenate containing as the only substituents in the phenyl radical a total of up to 3 chlorine and nitro radicals, said sulfenate being present in said composition in a quantity which is toxic to plant life.

6. A herbicidal composition comprising an oil-inwater emulsion of a substituted phenyl trichloromethyl disulfide, containing as the only substituents in the phenyl radical from 1 to 3 alkyl groups having from 1 to 5 carbon atoms, said disulfide being present in said composition in a quantity which is toxic to plant life.

7. A herbicidal composition comprising an oil-in-water emulsion of 2,4-dichlorophenyl trichloromethanesulfenate, said sulfenate being present in said composition in a quantity which is toxic to plant life.

8. A herbicidal composition comprising an oil-in-water emulsion of 2-chlorophenyl trichloromethanesulfenate, said sulfenate being present in said composition in a quantity which is toxic to plant life.

9. A herbicidal composition comprising an oil-in-water emulsion of 4-nitrophenyl trichloromethanesulfenate, said sulfenate being present in said composition in a quantity which is toxic to plant life.

10. A herbicidal composition comprising an oil-in-water emulsion of 2-chloro-4-nitrophenyl trichloromethanesulfenate, said sulfenate being present in said composition in a quantity which is toxic to plant life.

11. A herbicidal composition comprising an oil-in-water emulsion of 4-tolyl trichloromethyl disulfide, said disulfide being present in said composition in a quantity which is toxic to plant life.

12. The method of destroying undesired plants which comprises applying to said plants a toxic quantity of a herbicidal composition comprising a compound having the formula

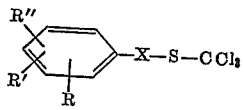

in which X is selected from the class consisting of —O— and —S— and R, R' and R" are selected from the class consisting of hydrogen, alkyl radicals of from 1 to 5 carbon atoms, chlorine and the nitro radical.

13. The method of destroying undesired plants which comprises applying to said plants a toxic quantity of a herbicidal composition comprising a substituted phenyl trichloromethanesulfenate containing, as the only substituents in the phenyl radical, from 1 to 3 chlorine atoms.

14. The method of destroying undesired plants which comprises applying to said plants a toxic quantity of a herbicidal composition comprising a substituted phenyl trichloromethyl disulfide containing, as the only substituents in the phenyl radical, from 1 to 3 alkyl radicals of from 1 to 5 carbon atoms.

15. The method of destroying undesired plants which comprises applying to said plants a toxic quantity of a herbicidal composition comprising 2,4-dichlorophenyl trichloromethanesulfenate.

16. The method of destroying undesired plants which comprises applying to said plants a toxic quantity of a herbicidal composition comprising 2-chlorophenyl trichloromethanesulfenate.

17. The method of destroying undesired plants which comprises applying to said plants a toxic quantity of a herbicidal composition comprising 4-nitrophenyl trichloromethanesulfenate.

18. The method of destroying undesired plants which comprises applying to said plants a toxic quantity of a herbicidal composition comprising 2-chloro-4-nitrophenyl trichloromethanesulfenate.

19. The method of destroying undesired plants which comprises applying to said plants a toxic quantity of a herbicidal composition comprising 4-tolyl trichloromethyl disulfide.

References Cited in the file of this patent

UNITED STATES PATENTS

| | | |
|---|---|---|
| 2,453,983 | Sexton et al. | Nov. 16, 1948 |
| 2,657,125 | Goodhue et al. | Oct. 27, 1953 |